United States Patent
Bedini (10) Patent No.: US 6,677,730 B2
(45) Date of Patent: Jan. 13, 2004

(54) DEVICE AND METHOD FOR PULSE CHARGING A BATTERY AND FOR DRIVING OTHER DEVICES WITH A PULSE

(75) Inventor: John C. Bedini, Coeur d'Alene, ID (US)

(73) Assignee: Energenx, Inc., Coeur d'Alene, ID (US)

( * ) Notice: Subject to any disclaimer, the term of this patent is extended or adjusted under 35 U.S.C. 154(b) by 46 days.

(21) Appl. No.: 10/032,125

(22) Filed: Dec. 21, 2001

(65) Prior Publication Data

US 2003/0117111 A1 Jun. 26, 2003

(51) Int. Cl.⁷ ................. H01M 10/44; H01M 10/46
(52) U.S. Cl. ................................................. 320/139
(58) Field of Search ........................... 320/103, 124, 320/125, 129, 130, 139, 166

(56) References Cited

U.S. PATENT DOCUMENTS

| | | |
|---|---|---|
| 5,307,000 A | 4/1994 | Podrazhansky et al. |
| 5,477,125 A | 12/1995 | Ettel et al. |
| 5,508,598 A | 4/1996 | Al-Abassy |
| 5,550,453 A | 8/1996 | Bohne et al. |
| 5,617,005 A | 4/1997 | Brown, Jr. et al. |
| 5,627,451 A | 5/1997 | Takeda |
| 5,684,386 A | 11/1997 | Okada |
| 5,686,815 A | 11/1997 | Reipur et al. |
| 5,694,023 A | 12/1997 | Podrazhansky et al. |
| 5,705,915 A | 1/1998 | Douglas et al. |
| 5,900,718 A | 5/1999 | Tsenter |
| 5,912,547 A | 6/1999 | Grabon |
| 5,945,811 A | 8/1999 | Hasegawa et al. |
| 5,945,812 A | 8/1999 | Choi |
| 5,998,968 A | 12/1999 | Pittman et al. |
| 6,043,631 A | 3/2000 | Tsenter |
| 6,060,865 A | 5/2000 | Chen |
| 6,114,839 A | 9/2000 | Takano et al. |
| 6,133,713 A | 10/2000 | Brotto |
| 6,154,011 A | 11/2000 | Lam et al. |
| 6,191,560 B1 | 2/2001 | Sakakibara |
| 6,211,651 B1 | 4/2001 | Nemoto |
| 6,229,285 B1 | 5/2001 | Ding |
| 6,232,750 B1 | 5/2001 | Podrazhansky et al. |
| 6,259,231 B1 | 7/2001 | Hansen |

OTHER PUBLICATIONS

US 6,175,216, 1/2001, Andersen et al. (withdrawn)

*Primary Examiner*—Edward H. Tso
(74) *Attorney, Agent, or Firm*—Thomas G. Walsh; Graybeal Jackson Haley LLP (57) ABSTRACT

A two-phase solid-state battery charger can receive input energy from a variety of sources including AC current, a battery, a DC generator, a DC-to-DC inverter, solar cells or any other compatible source of input energy. Phase I is the charge phase and phase II the discharge phase wherein a signal or current passes through a dual timing switch that controls independently two channels dividing the two phases. The dual timing switch is controlled by a logic chip or pulse width modulator. A potential charge is allowed to build up in a capacitor bank, the capacitor bank is then disconnected from the energy input source and then pulse charged at high voltage into the battery to receive the charge. The momentary disconnection of the capacitor from the input energy source allows for a free-floating potential charge in the capacitor. Once the capacitor has completed discharging the potential charge into the battery, the capacitor disconnects from the battery and re-connects to the energy source thus completing the two-phase cycle.

25 Claims, 6 Drawing Sheets

DEVICE AND METHOD FOR PULSE CHARGING A BATTERY AND FOR DRIVING OTHER DEVICES WITH A PULSE

TECHNICAL FIELD

The invention relates generally to a battery pulse charger using a solid-state device and method wherein the current going to the battery is not constant. The signal or current is momentarily switch-interrupted as it flows through either the first channel, the charge phase, or the second channel, the discharge phase. This two-phase cycle alternates the signal in the two channels thereby allowing a potential charge in a capacitor to disconnect from its power source an instant before the capacitor discharges its stored potential energy into a battery for receiving the capacitor's stored energy. The capacitor then disconnects from the battery and re-connects to the power source upon completion of the discharge phase, thereby completing charge-discharge cycle. The battery pulse charger can also drive devices, such as a motor and a heating element, with pulses.

BACKGROUND AND PRIOR ART

Present day battery chargers use a constant charge current in their operation with no momentary disconnection of the signal or current as it flows either: 1) from a primary energy source to the charger; or 2) from the charger itself into a battery for receiving the charge. Some chargers are regulated to a constant current by any of several methods, while others are constant and are not regulated. There are no battery chargers currently in the art or available wherein there is a momentary signal or current disconnection between the primary energy source and the charger capacitors an instant before the capacitors discharge the stored potential energy into a battery receiving the pulse charge. Nor are there any chargers in the art that disconnect the charger from the battery receiving the charge when the charger capacitors receive energy from the primary source. The momentary current interruption allows the battery a short "rest period" and requires less energy from the primary energy source while putting more energy into the battery receiving the charge while requiring a shorter period of time.

SUMMARY OF THE INVENTION

One aspect of the invention relates to a solid-state device and method for creating a pulse current to pulse charge a battery or a bank of batteries in which a new and unique method is used to increase and preserve for a longer period of time the energy stored in the battery as compared to constant-current battery chargers. The device uses a timed pulse to create a waveform in a DC pulse to be discharged into the battery receiving the charge.

One embodiment of the Invention uses a means for dual switching such as a pulse width modulator (PWM), for example, a logic chip SG3524N PWM, and a means for optical coupling to a bank of high-energy capacitors to store a timed initial pulse charge. This is the charge phase, or phase I. The charged capacitor bank then discharges the stored high energy into the battery receiving the charge in timed pulses. Just prior to discharging the stored energy into the battery, the capacitor bank is momentarily disconnected from the power source, thus completing the charge phase, and thereby leaving the capacitor bank as a free-floating potential charge disconnected from the primary energy source to then be discharged into the battery. The transfer of energy from the capacitor bank to the battery completes the discharge phase, or phase II. The two-phase cycle now repeats itself.

This embodiment of the battery pulse charger works by transferring energy from a source, such as an AC source, to an unfiltered DC source of high voltage to be stored in a capacitor or a capacitor bank. A switching regulator is set to a timed pulse, for example, a one second pulse that is 180 degrees out of phase for each set of switching functions. The first function is to build the charge in the capacitor bank from the primary energy source; the second function is to disconnect the power source from the capacitor bank; the third function is to discharge the stored high voltage to the battery with a high voltage spike in a timed pulse, for example, a one second pulse; and the fourth function is to re-connect the capacitor bank to the primary energy source. The device operates through a two-channel on/off switching mechanism or a gauging/re-gauging function wherein the charger is disconnected from its primary energy source an instant before the pulse charger discharges the high-energy pulse into the battery to be charged. As the primary charging switch closes, the secondary discharging switch opens, and visa-versa in timed pulses to complete the two phase cycle.

The means for a power supply is varied with several options available as the primary energy source. For example, primary input energy may come from an AC source connected into the proper voltage (transformer); from an AC generator; from a primary input battery; from solar cells; from a DC-to-DC inverter; or from any other adaptable source of energy. If a transformer means is the source of primary input energy, it can be a standard rectifying transformer used in power supply applications or any other transformer means applicable to the desired function. For example, it can be a 120-volt to 45-volt AC step-down transformer, and the rectifier can be a full-wave bridge of 200 volts at 20 amps, which is unfiltered when connected to the output of the transformer. The positive output terminal of the bridge rectifier is connected to the drains of the parallel field-effect transistors, and the negative terminal is connected to the capacitor bank negative.

The Field Effect Transistor (FET) switches can be IRF260 FETs, or any other FET means to accomplish this function. All are in parallel to achieve the proper current of the pulses. Each FET may be connected through a 7-watt, 0.05-ohm resistor with a common bus connection at the source. All the FET gates may be connected through a 240-ohm resistor to a common bus. There also may be a 2 K-ohm resistor between the gates and the drain bus.

A transistor means, for example an MJE15024 transistor, as a driver for the gates, drives the bus and in turn, an optical coupler drives the driver transistor through the first channel. A first charging switch is used to charge the capacitor bank, which acts as a DC potential source to the battery. The capacitor bank is then disconnected from the power rectifier circuit. The pulse battery charger is then transferred to a second field effect switch through the second channel for the discharge phase. The discharge phase is driven by a transistor, the transistor driven by an optical coupler. With a second or discharge switch on, the capacitor bank potential charge is discharged into the battery to receive the charge. The battery receiving the charge is then disconnected from the pulse charger capacitor bank to repeat the cycle. The pulse charger may have any suitable source of input power including: 1) solar panels to raise the voltage to the capacitor bank; 2) a wind generator; 3) a DC-to-DC inverter; 4) an alternator; 5) an AC motor generator; 6) a static source such as a high voltage spark; and 7) other devices that can raise the potential of the capacitor bank.

In another embodiment of the invention, one can use the pulse charger to drive a device such as a motor or heating element with pulses of energy.

BRIEF DESCRIPTION OF THE DRAWINGS

FIGS. 4A–D are schematic drawings of other conventional power supplies that can be used to provide power to the pulse charger of FIG. 1 according to an embodiment of the invention.

DETAILED DESCRIPTION OF THE INVENTION

An embodiment of the present invention is a device and method for a solid-state pulse charger that uses a stored potential charge in a capacitor bank. The solid-state pulse charger comprises a combination of elements and circuitry to capture and store available energy into a capacitor bank. The stored energy in the capacitors is then pulse charged into the battery to be charged. In one version of this embodiment, there is a first momentary disconnection between the charger and the battery receiving the charge during the charge phase of the cycle, and a second momentary disconnection between the charger and the input energy source during the discharge phase of the cycle.

As a starting point and an arbitrary method in describing this device and method, the flow of an electrical signal or current will be tracked from the primary input energy to final storage in the battery receiving the pulse charge.

Figure 1:
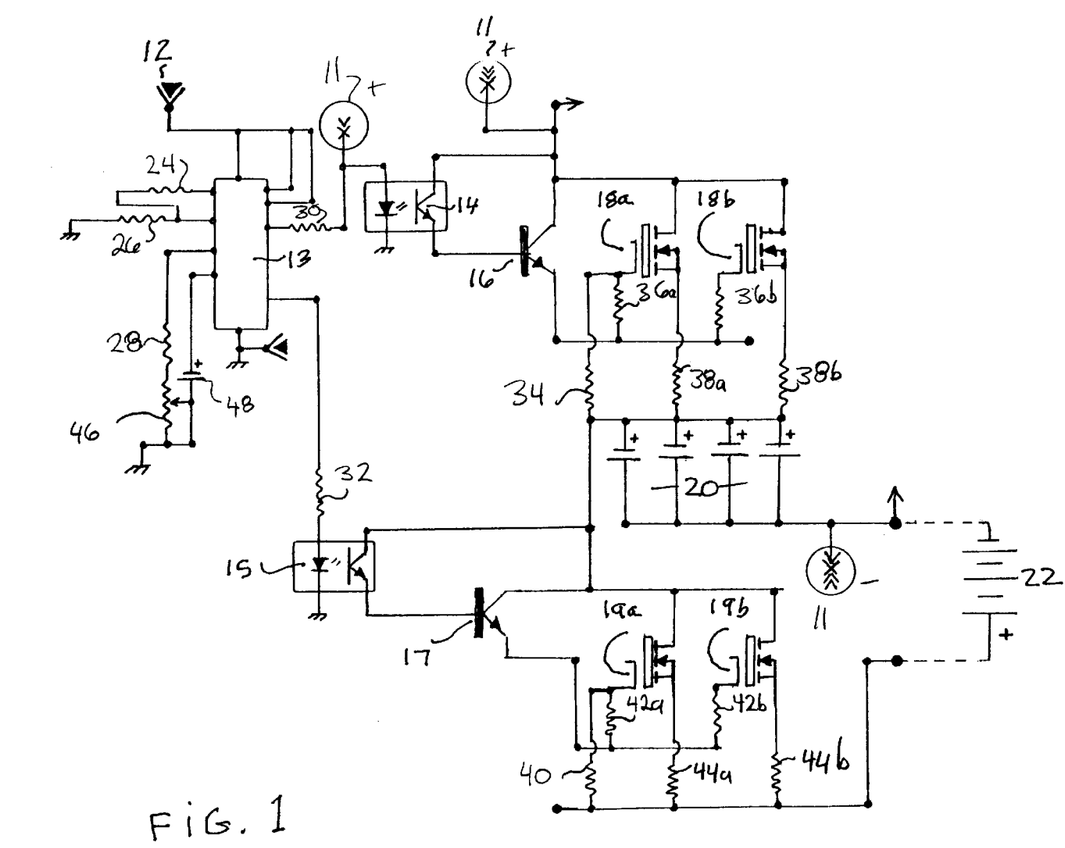
FIG. 1 is a schematic drawing of a solid-state pulse charger according to an embodiment of the invention.

FIG. 1 is a schematic drawing of the solid-state pulse charger according to an embodiment of the invention. As shown in FIG. 1, the primary input energy source to the pulse charger is a power supply 11, examples of which are shown in FIGS. 2, 3, 4A–4D. A 12-volt battery, as a low voltage energy source 12, drives a dual switching means of control such as a logic chip or a pulse width modulator (PWM) 13. Alternatively, the voltage from the power supply 11 may be converted to a voltage suitable to power the PWM 13. The PWM 13 may be an SG3524N logic chip, and functions as an oscillator or timer to drive a 2-channel output with "on/off" switches that are connected when on to either a first optical isolator 14, or in the alternative, to a second optical isolator 15. The first and second optical isolators 14 and 15 may be H11D3 optical isolators. When the logic chip 13 is connected to a first channel, it is disconnected from a second channel, thus resulting in two phases of signal direction; phase I, a charge phase, and phase II, a discharge phase. When the logic chip 13 is switched to the charge phase, the signal flows to the first optical isolator 14. From the optical isolator 14, the signal continues its flow through a first NPN power transistor 16 that activates an N-channel MOSFET 18a and an N-channel MOSFET 18b. Current flowing through the MOSFETs 18a and 18b builds up a voltage across a capacitor bank 20, thereby completing the charge phase of the switching activity. The discharge phase begins when the logic chip 13 is switched to the second channel, with current flowing to the second optical isolator 15 and then through a second NPN power transistor 17, which activates an N-channel MOSFET 19a and an N-channel MOSFET 19b. After the logic chip 13 closes the first channel and opens the second channel, the potential charge in the capacitor bank 20 is free floating between the power supply 11, from which the capacitor bank 20 is now disconnected, and then connected to a battery 22 to receive the charge. It is at this point in time that the potential charge in the capacitor bank 20 is discharged through a high-energy pulse into the battery 22 or, a bank (not shown) of batteries. The discharge phase is completed once the battery 22 receives the charge. The logic chip 13 then switches the second channel closed and opens the first channel thus completing the charge-discharge cycle. The cycle is repetitive with the logic chip 13 controlling the signal direction into either channel one to the capacitor bank, or to channel two to the battery 22 from the capacitor bank. The battery 22 is given a momentary rest period without a continuous current during the charge phase.

The component values for the described embodiment are as follows. The resistors 24, 26, . . . 44b have the following respective values: 4.7KΩ, 4.7KΩ, 47KΩ, 330Ω, 330Ω, 2KΩ, 47Ω, 47Ω, 0.05Ω(7 W), 0.05Ω(7W), 2KΩ, 47Ω, 47Ω, 0.05Ω(7 W), and 0.05Ω(7W). The potentiometer 46 is 10KΩ, the capacitor 48 is 22 μF, and the total capacitance of the capacitor bank 20 is 0.132F. The voltage of the battery 22 is between 12–24 V, and the voltage of the power supply 11 is 24–50 V such that the supply voltage is approximately 12–15 V higher than the battery voltage.

Other embodiments of the pulse charger are contemplated. For example, the bipolar transistors 16 and 17 may be replaced with field-effect transistors, and the transistors 18a, 18b, 19a, and 19b may be replaced with bipolar or insulated-gate bipolar (IGBT) transistors. Furthermore, one can change the component values to change the cycle time, the peak pulse voltage, the amount of charge that the capacitor bank 20 delivers to the battery 22, etc. In addition, the pulse charger can have one or more than two transistors 18a and 18b, and one or more than two transistors 19a and 19b.

Still referring to FIG. 1, the operation of the above-discussed embodiment of the pulse charger is discussed.

To begin the first phase of the cycle during which the capacitor bank 20 is charged, the logic circuit 13 deactivates the isolator 15 and activates the isolator 14. Typically, the circuit 13 is configured to deactivate the isolator 15 before or at the same time that it activates the isolator 14, although the circuit 13 may be configured to deactivate the isolator 15 after it activates the isolator 14.

Next, the activated isolator 14 generates a base current that activates the transistor 16, which in turn generates a current that activates the transistors 18a and 18b.

The activated transistors 18a and 18b charge the capacitors in the bank 20 to a charge voltage equal or approximately equal to the voltage of the power supply 11 less the lowest threshold voltage of the transistors 18a and 18b. To begin the second phase of the cycle during which the capacitor bank 20 pulse charges the battery 22, the logic circuit 13 deactivates the isolator 14 and activates the isolator 15. Typically, the circuit 13 is configured to deactivate the isolator 14 before or at the same time that it activates the isolator 15, although the circuit 13 may be configured to deactivate the isolator 14 after it activates the isolator 15.

Next, the activated isolator 15 generates a base current that activates the transistor 17, which in turn generates a current that activates the transistors 19a and 19b.

The activated transistors 19a and 19b discharge the capacitors in the bank 20 into the battery 22 until the voltage across the bank 20 is or is approximately equal to the voltage across the battery 22 plus the lowest threshold voltage of the transistors 19a and 19b. Alternatively, the circuit 13 can deactivate the isolator 15 at a time before the bank 20 reaches this level of discharge. Because the resistances of the transistors 19a and 19b, the resistors 44a and 44b, and the battery 22 are relatively low, the capacitors in the bank 20 discharge rather rapidly, thus delivering a pulse of current to charge the battery 22. For example, where the pulse charger includes components having the values listed above, the bank 20 delivers a pulse of current having a duration of or approximately of 100 ms and a peak of or approximately of 250 A.

Figure 2:
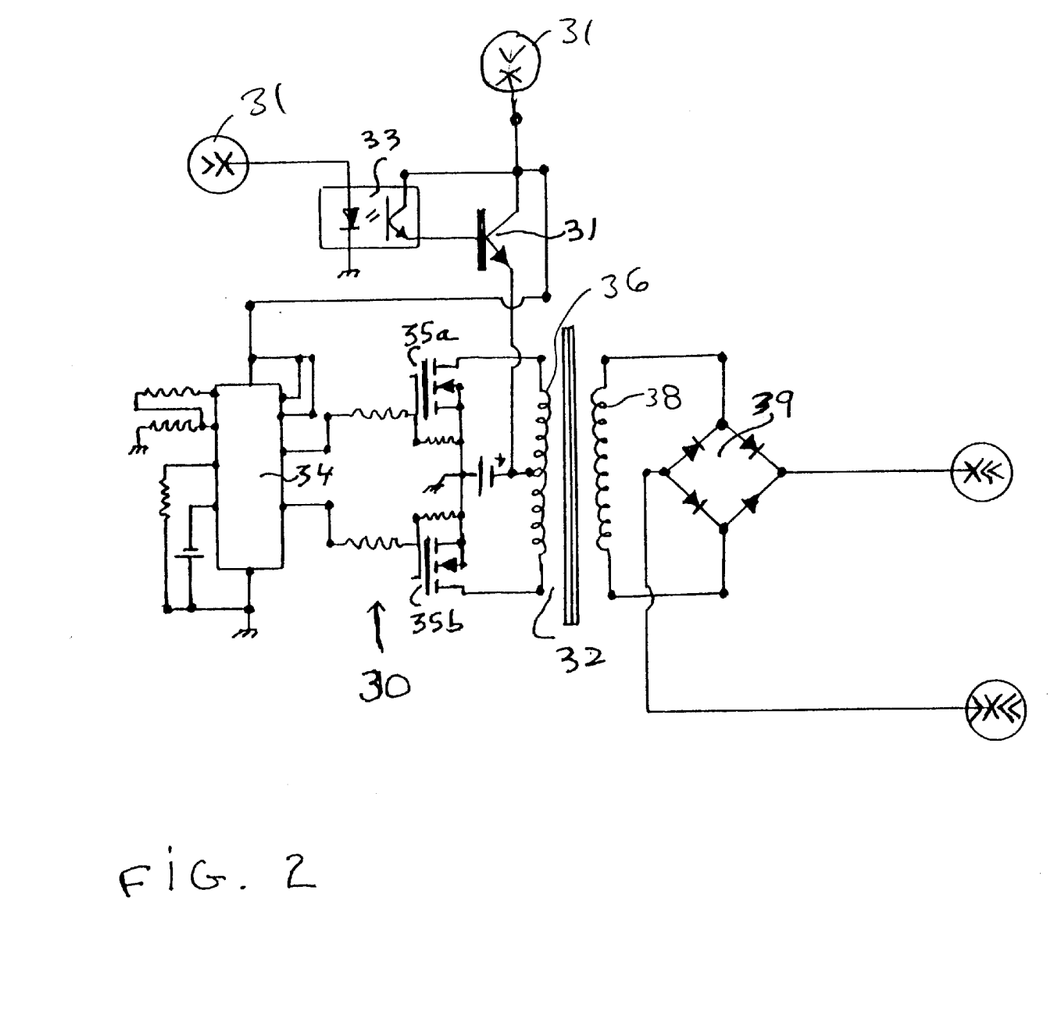
FIG. 2 is a schematic drawing of a conventional DC-to-DC converter that can be used to provide power to the pulse charger of FIG. 1 according to an embodiment of the invention.

FIG. 2 is a schematic drawing of a conventional DC-to-DC converter 30 that can be used as the power supply 11 of FIG. 1 according to an embodiment of the invention. A DC-to-DC converter converts a low DC voltage to a higher DC voltage or vice-versa. Therefore, such a converter can convert a low voltage into a higher voltage that the pulse charger of FIG. 1 can use to charge the capacitor bank 20 (FIG. 1). More specifically, the converter 30 receives energy from a source 31 such as a 12-volt battery. An optical isolator sensor 33 controls an NPN power transistor 31, which provides a current to a primary coil 36 of a power transformer 32. A logic chip or pulse width modulator (PWM) 34 alternately switches on and off an IRF260 first N-channel MOSFET 35a and an IRF260 second N-channel MOFSET 35b such that when the MOSFET 35a is on the MOSFET 35b is off and vice-versa. Consequently, the switching MOSFETS 35a and 35b drive respective sections of the primary coil 36 to generate an output voltage across a secondary coil 38. A full-wave bridge rectifier 39 rectifies the voltage across the secondary coil 38, and this rectified voltage is provided to the pulse charger of FIG. 1. Furthermore, the secondary coil 38 can be tapped to provide a lower voltage for the PWM 13 of FIG. 1 such that the DC-to-DC converter 30 can be used as both the power supply 11 and the low-voltage supply 12 of FIG. 1.

Figure 3:
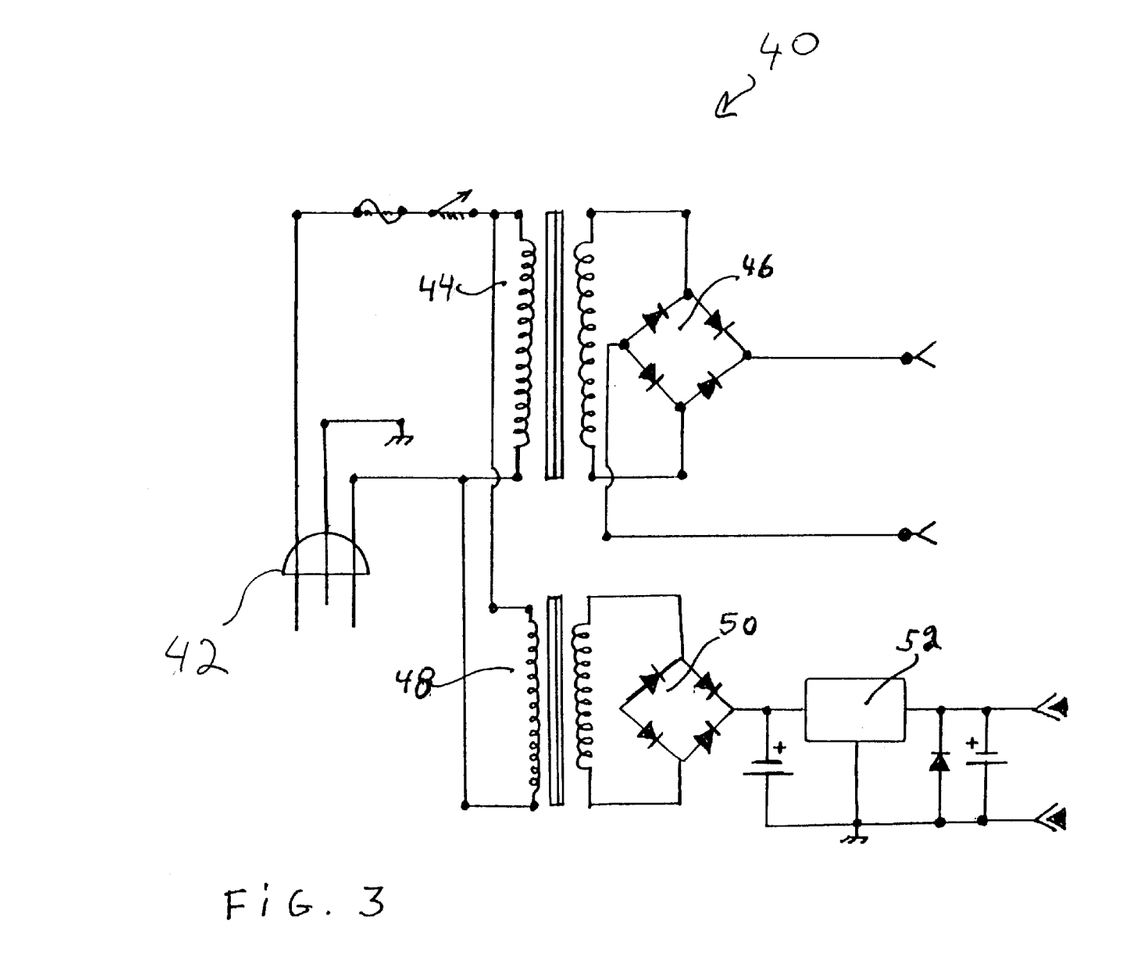
FIG. 3 is a schematic drawing of a conventional AC power supply that can be used to provide power to the pulse charger of FIG. 1 according to an embodiment of the invention.

FIG. 3 is a schematic drawing of an AC power supply 40 that can be used as both the power supply 11 and the power supply 12 of FIG. 1 according to an embodiment of the invention. The power input 42 to the supply 40 is 120 VAC. A first transformer 44 and full-wave rectifier 46 compose the supply 11, and a second transformer 48, full-wave rectifier 50, and voltage regulator 52 compose the supply 12.

Figure 4A:
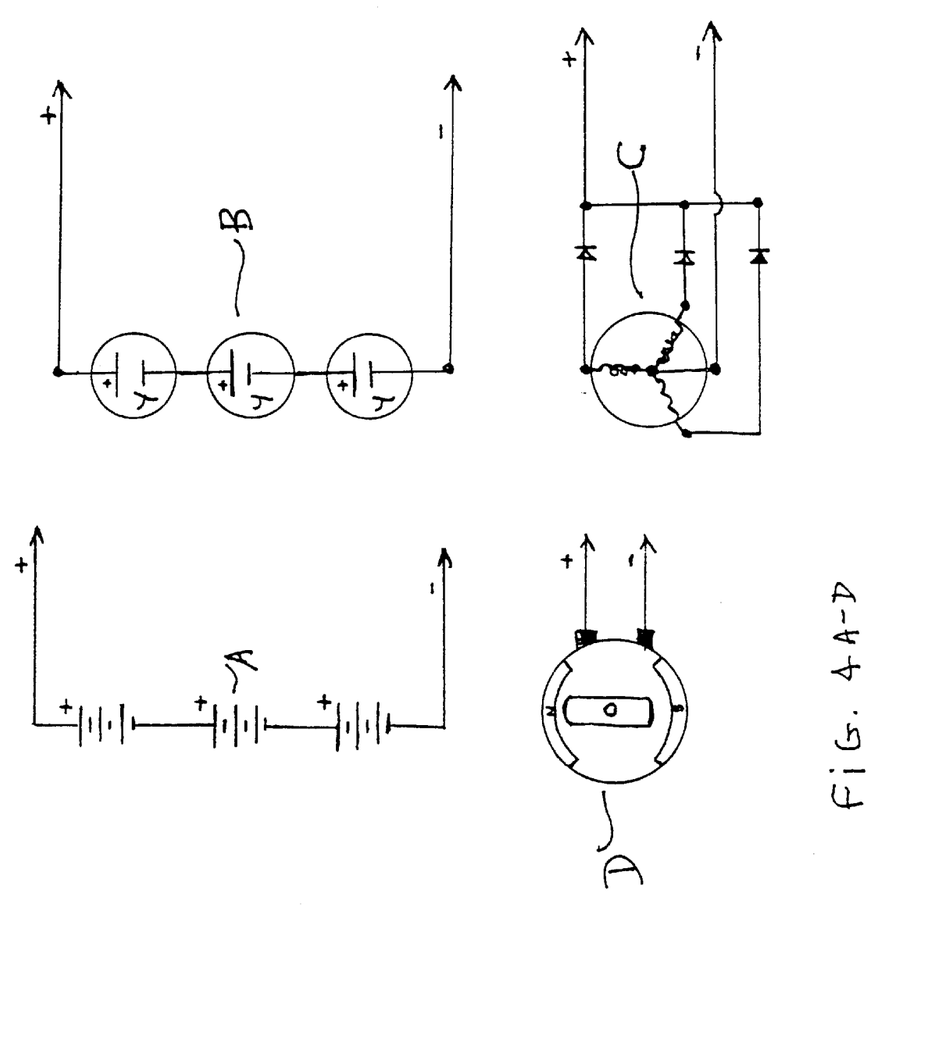

FIGS. 4A–D are schematic drawings of various conventional primary energy input sources that can be used as the supply 11 and/or the supply 12 of FIG. 1 according to an embodiment of the invention. FIG. 4A is a schematic drawing of serially coupled batteries; FIG. 4B is a schematic drawing of serially coupled solar cells; FIG. 4C is a schematic drawing of an AC generator; and FIG. 4D is a schematic drawing of a DC generator.

Figure 5:
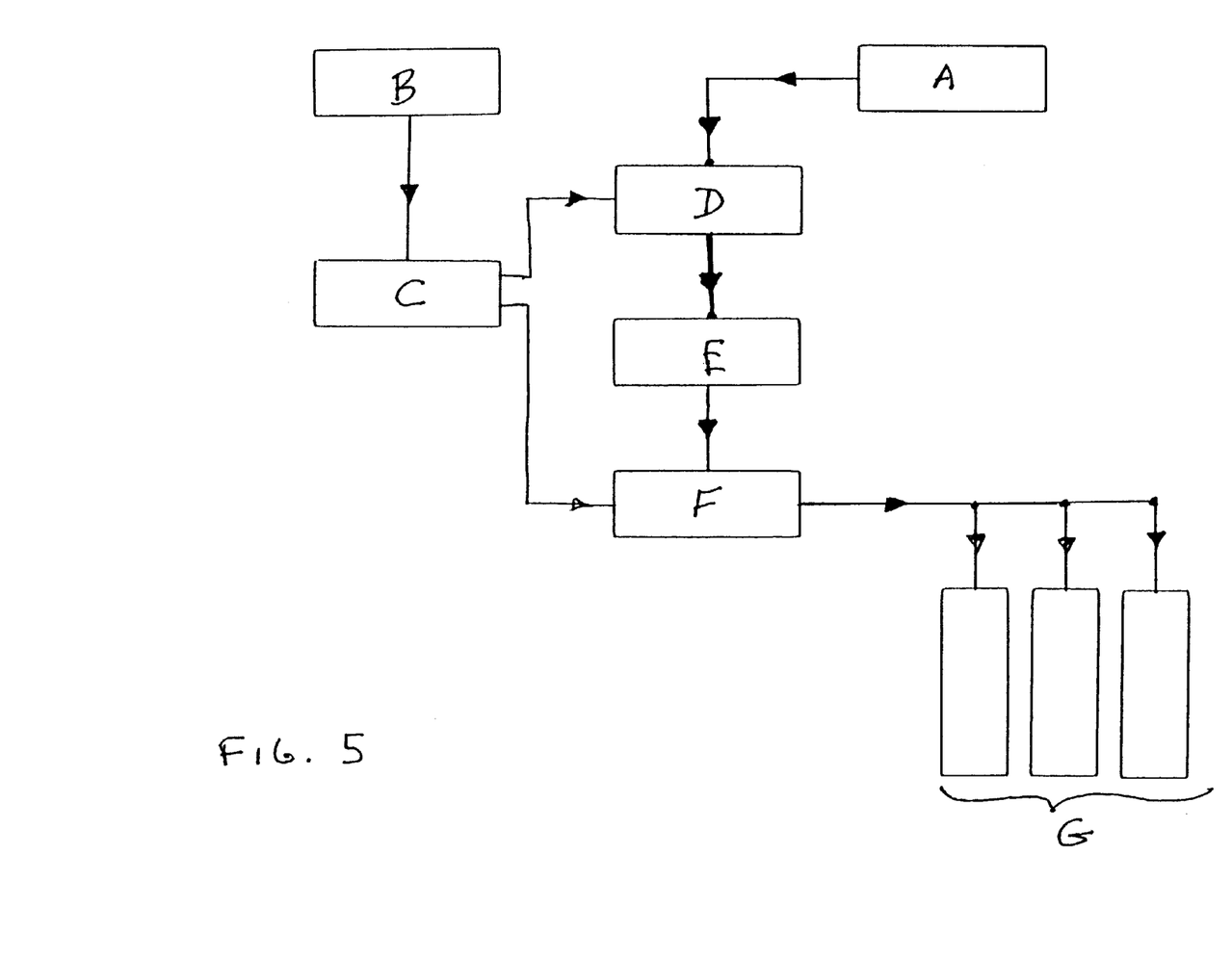
FIG. 5 is a block diagram of the solid-state pulse charger of FIG. 1 according to an embodiment of the invention.

FIG. 5 is a block diagram of the solid-state pulse charger of FIG. 1 according to an embodiment of the invention. Block A is the power supply 11, which can be any suitable power supply such as those shown in FIGS. 2, 3, 4A–4D. Block B is the power supply 12, which can be any suitable power supply such as a 12 VDC supply or the supply shown in FIG. 3. Block C is the PWM 13 and its peripheral components. Block D is the charge switch that includes the first optical isolator chip 14, the first NPN power transistor 16, the first set of two N-channel MOSFETs 18a and 18b, and their peripheral resistors. Block E is the capacitor bank 20. Block F is the discharge switch that includes the second optical isolator chip 15, the second NPN power transistor 17, the second set of two N-channel MOSFETs 19a and 19b, and their peripheral resistors. Block G is the battery 22 that is being pulse charged.

A unique feature that distinguishes one embodiment of the above-described pulse charger from conventional chargers is the method charging the battery with pulses of current instead of with a continuous current. Consequently, the battery is given a reset period between pulses.

Figure 6:
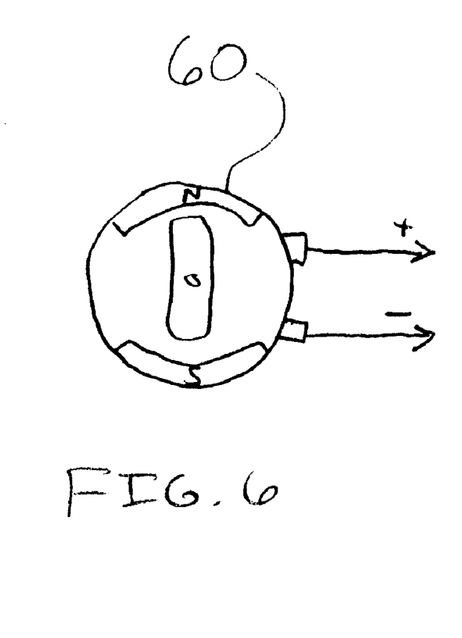
FIG. 6 is a diagram of a DC motor that the pulse charger of FIG. 1 can drive according to an embodiment of the invention.

FIG. 6 is a diagram of a DC motor 60 that the pulse charger of FIG. 1 can drive according to an embodiment of the invention. Specifically, one can connect the motor 60 in place of the battery 22 (FIG. 1) such that the pulse charger drives the motor with pulses of current. Although one need not modify the pulse charger to drive the motor 60, one can modify the pulse charger to make it more efficient for driving the motor. For example, one can modify the values of the resistors peripheral to the PWM 13 (FIG. 1) to vary the width and peak of the drive pulses from the capacitor bank 20 (FIG. 1).

Figure 7:
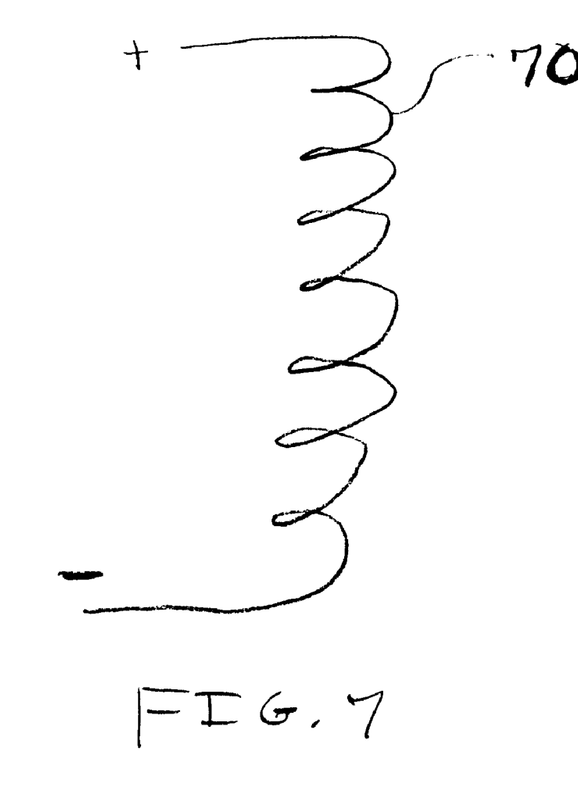
FIG. 7 is a diagram of a heating element that the pulse charger of FIG. 1 can drive according to an embodiment of the invention.

FIG. 7 is a diagram of a heating element 70, such as a dryer- or water-heating element, that the pulse charger of FIG. 1 can drive according to an embodiment of the invention. Specifically, one can connect the heating element 70 in place of the battery 22 (FIG. 1) such that the pulse charger drives the element with pulses of current. Although one need not modify the pulse charger to drive the element 70, one can modify the pulse charger to make it more efficient for driving the element. For example, one can modify the values of the resistors peripheral to the PWM 13 (FIG. 1) to vary the width and peak of the drive pulses from the capacitor bank 20 (FIG. 1).

In the embodiments discussed above, specific electronic elements and components are used. However, it is known that a variety of available transistors, resistors, capacitors, transformers, timing components, optical isolators, pulse width modulators, MOSFETs, and other electronic components may be used in a variety of combinations to achieve an equivalent result. Finally, although the invention has been described with reference of particular means, materials and embodiments, it is to be understood that the invention is not limited to the particulars disclosed and extends to all equivalents within the scope of the claims.

What is claimed is:

1. A solid-state pulse battery charger wherein input power from a primary source is stored as a potential charge in a capacitor bank, said capacitor bank then disconnected from said input power source through a dual timing means, said capacitor then connected to a battery to receive the potential charge, the charge then discharged into said battery from said capacitor, said battery then disconnected from said capacitor through said dual timing means, said capacitor then re-connected to said input power source completing a two phase switching cycle comprising:

a. a means for providing input power;
b. a means for timing a signal and a current flow in two phases, a charge phase and a discharge phase, through either a first channel output for charging said capacitor bank, or a second channel output for discharging stored energy from said capacitor into said battery, the current flowing from said first channel output through a first optical isolator and through a first NPN power transistor, said first transistor activating a first pair of N-channel MOSFETs with voltage stored as the potential charge in said capacitor bank, said capacitor disconnecting from said input power means by said timing means;
c. said means for timing current flow connecting to said second channel output, current flowing from said second channel through a second optical isolator and through a second NPN power transistor, said second transistor activating a second pair of N-channel MOSFETs, said capacitor connecting to said battery, the potential charge discharging into said battery, said timing means disconnecting said capacitor from said battery, and connecting said capacitor to said power means.

2. The pulse charger of claim 1 wherein the means for providing input power is an AC voltage current.

3. The pulse charger of claim 1 wherein the means for providing input power is a battery.

4. The pulse charger of claim 1 wherein the means for providing input power is a DC generator.

5. The pulse charger of claim 1 wherein the means for providing input power is an AC generator.

6. The pulse charger of claim 1 wherein the means for providing input power is a solar cell.

7. The pulse charger of claim 1 wherein the means for providing input power is a DC-to-DC inverter.

8. A method of making a solid-state pulse battery charger wherein input power from a primary source is stored as a potential charge in a capacitor bank, said capacitor disconnected from said input power source through a dual timing means, said capacitor connected to a battery to receive the potential charge, said charge discharged into said battery from said capacitor, said battery disconnected from said capacitor through said dual timing means, said capacitor reconnected to said input power source completing a two phase cycle comprising the steps of:
a. providing a source of input power;
b. connecting a means for dual-timing said charger to control a signal or current flow through a first channel output comprising a first optical isolator, a first NPN power transistor and a first pair of N-channel MOSFETs;
c. capturing energy from said current and storing said energy in said capacitor bank thereby charging said capacitor;
d. switching the flow of said current using said timing device to a second channel comprising a second optical isolator, a second NPN power transistor and a second pair of N-channel MOSFETs, thus disconnecting said capacitor from said power source and connecting said capacitor to said battery;
e. discharging the potential charge into said battery;
f. switching the flow of the current using said timing device to said power source and said first channel to complete said cycle.

9. The pulse charger of claim 8 wherein the means for providing input power is an AC voltage current.

10. The pulse charger of claim 8 wherein the means for providing input power is a battery.

11. The pulse charger of claim 8 wherein the means for providing input power is a DC generator.

12. The pulse charger of claim 8 wherein the means for providing input power is an AC generator.

13. The pulse charger of claim 8 wherein the means for providing input power is a solar cell.

14. The pulse charger of claim 8 wherein the means for providing input power is a DC-to-DC inverter.

15. A battery charger, comprising:

a supply node;

a charge node;

a charge-storage device; and a switch circuit coupled to the supply and the charge nodes and the charge-storage device, the switch circuit operable to,
charge the charge-storage device and prohibit a battery-charge current from flowing into the charge node during a battery-rest period; and
allow the battery-charge current to flow from the charge-storage device into the charge node during a battery-charge period, and prohibit the battery-charge current from flowing into the charge node during a battery-rest period.

16. The battery charger of claim 15, further comprising:

a capacitor coupled to the switch circuit; and wherein the switch circuit is operable to,
allow the battery-charge current to from the capacitor into the charge node during the battery-charge period, and
charge the capacitor during the battery-rest period.

17. A method, comprising:

charging a battery during a first period of a charge cycle; and accumulating charge in a charge-storage device and prohibiting the charging of the battery during a second period of the charge cycle.

18. The method of claim 17 wherein:

charging the battery comprises charging the battery with a charge current during the first period of the charge cycle; and prohibiting the charging of the battery comprises prohibiting the charge current from flowing into the battery during the second period of the charge cycle.

19. The method of claim 17, wherein:

charging the battery comprises discharging the charge-storage device into the battery during the first period of the charge cycle; and prohibiting the charging of the battery comprises uncoupling the charge-storage device from the battery during the second period of the charge cycle.

20. The method of claim 17 wherein the charge-storage device comprises a capacitor.

21. The method of claim 17 wherein the length of the second period is related to a level of charge accumulated in the charge-storage device.

22. A method, comprising:
discharging a charge-storage device into a battery during a first period of a battery-charge cycle; and
uncoupling the charge-storage device from the battery and charging the charge-storage device during a second period of the battery-charge cycle.

23. The method of claim 22 wherein uncoupling the charge-storage device comprises uncoupling the charge-storage device from the battery before commencing charging of the charge-storage device.

24. The method of claim 22 wherein uncoupling the charge-storage uncoupling the charge-storage device from the battery after commencing charging of the charge-storage device.

25. The method of claim 22 wherein uncoupling the charge-storage device comprises simultaneously uncoupling the charge-storage device from the battery and commencing charging of the charge-storage device.

* * * * *

UNITED STATES PATENT AND TRADEMARK OFFICE
CERTIFICATE OF CORRECTION

PATENT NO.    : 6,677,730 B2
DATED         : January 13, 2004
INVENTOR(S)   : John C. Bedini It is certified that error appears in the above-identified patent and that said Letters Patent is hereby corrected as shown below:

Column 10,
Line 2, before "uncoupling", please insert -- device comprises --.

Signed and Sealed this

Sixth Day of July, 2004

JON W. DUDAS
*Acting Director of the United States Patent and Trademark Office*